Feb. 20, 1945.  F. L. JONES ET AL  2,369,741
TRANSMISSION FILM FOR GLASS AND METHODS FOR PRODUCING SAME
Filed Nov. 8, 1940
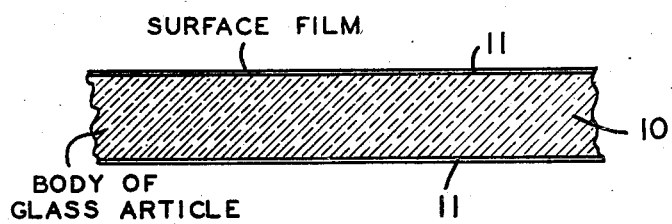
FRANK L. JONES
THEODORE J. ZAK
INVENTORS
BY
ATTORNEYS Patented Feb. 20, 1945

2,369,741

UNITED STATES PATENT OFFICE 2,369,741

TRANSMISSION FILM FOR GLASS AND METHOD FOR PRODUCING SAME

Frank L. Jones, Edgewood, Pa., and Theodore J. Zak, Rochester, N. Y., assignors to Bausch & Lomb Optical Company, Rochester, N. Y., a corporation of New York Application November 8, 1940, Serial No. 364,938

9 Claims. (Cl. 49—79)

Our invention relates to the treatment of glass articles including optical elements such as lenses, prisms and the like, and more particularly has reference to a process wherein the air contacting surfaces of such articles are provided with stabilized films or surface layers, generally although not necessarily designed to increase the light transmission of such articles, as well as a process wherein such films may be chemically formed upon a polished glass surface without effect upon its polish. Also, the invention is concerned with the product resulting from the practice of this process.

A glass element which has become tarnished has an increased light transmission due to the tarnished surface decreasing the reflection of the incident light falling upon the element. This tarnish has been found to be a film or layer of transparent material which has a refractive index less than that of the glass. Such a film may be created by chemical treatment designed to leach the acid soluble oxides, such as lead, boron, barium, calcium, sodium, potassium and zinc out of the original surface of the glass undergoing treatment. The leaching results in the formation of a surface film or new surface layer of material which is rich in silica.

Under present methods making use of chemical treatment, uncertain results in the formation of transmission or similarly formed films are likely. These vary widely from the formation of a desired uniform film, which however is not necessarily immune to subsequent chemical attack with attendant undesired film growth by increase in film thickness, to the formation of a film of undesired thickness or one of uneven thickness or one which may be unevenly distributed over the glass surface. Due to these uncertainties, chemical treatment produces a high percentage of imperfect and relatively useless films. It will thus be appreciated that the creation of films or surface layers by the chemical processes heretofore employed has been extremely limited from a commercial standpoint by reason of the impossibility of such practice to guarantee a uniform or standard result or film or to guarantee a film which once perfectly formed will remain in a stabilized condition and resistant to subsequent chemical attack which would cause film growth.

It is hence a major object of this invention to provide an improved process, involving chemical treatment, for the formation of films or surface layers upon glass surfaces.

An equally important object is to provide on a glass surface, an improved chemically formed film which is of uniform thickness and is evenly distributed over the glass surface.

Another object of the invention is to provide a film created by chemical treatment, which film is impenetrable to further attack by leaching solutions and is stabilized against changes in thickness.

Still another object of the invention is to provide a method assuring the formation upon a glass surface, without damage to its polish, of a transmission film or other surface layer of uniform thickness and one which is evenly distributed over the surface undergoing treatment.

A further object of the invention is the provision in a process for chemically creating a film or other surface layer upon a glass surface of a procedure for maintaining or preparing the surface in that condition best receptive to the action of film forming reactants.

Yet a further object of the invention is to devise a procedure for preventing chemical attack upon a glass surface prior to chemical treatment for formation of a desired surface layer as well as a procedure for removing any film accidentally formed on the glass surface prior to treatment leading to the creation of a desired film.

A still further object is to provide a practice for stabilizing or fixing a film, formed by chemical means, which involves the step of heat treating an already formed film until it is in condition to resist subsequent chemical attack leading to undesired film growth by change in thickness.

With these and other objects in view which may be incident to our improvements, the invention consists in the procedure, combination of steps therein and the resultant product, to be hereinafter set forth and claimed, with the understanding that the practices and reagents set forth may be widely varied, without departing from the spirit of the invention or exceeding the scope of the appended claims.

The benefits to be derived from the use of films or surface layers may be well illustrated by a consideration of their application to increase the light transmission of lenses. For example, the reflections from a lens when regarded from the viewpoint of light economy are highly undesirable since the light which is reflected is obtained solely at the expense of the transmitted beam, thereby weakening the latter. Reflection loss at a single untreated air-glass surface will amount to approximately 4% of the incident light for crown glasses and approximately 6% for flint glasses. Thus an untreated crown glass singlet with two air-glass surfaces will transmit only 92% of the incident light while an untreated flint glass singlet with two air-glass surfaces will transmit only 88% of the incident light. While it is true that the amount of light lost by reflection at a single air-glass surface is not imposing, the importance of increasing light transmission by decreasing reflection loss will be realized when it is considered that the cumulative effect of this loss repeated at each surface may become greater than 50% in an objective with only four free elements, or eight air-glass surfaces, which is a rather common construction. A more complicated optical system often incorporates as many as twenty or more air-glass surfaces, each one contributing implacably to the total loss of light for useful image formation. The advantages of transmission films will be apparent when in comparison with the above it is considered that light transmission following filming has consistently reached the figures of 97% for a flint glass lens, 96% for a lens of a light barium crown and 95% for a borosilicate crown.

The prior art practice for the chemical formation of a transmission film or other surface layer on a polished or otherwise finished glass article comprises immersing the article in a solvent or leaching agent which will remove certain of the materials from the glass and leave a surface film or layer which is rich in silica. Heretofore this practice has been limited to removal of the high refractive index oxides, such as lead, barium and boron, from glass. By the procedure hereinafter described, in addition to the high refractive index oxides we are able to remove other acid soluble oxides found in glass including, sodium, potassium, calcium and zinc.

One of the requirements for a theoretically perfect transmission film is that it have an optical thickness equal to one-fourth the wavelength of the incident light, optical thickness being equal to physical thickness divided by refractive index. In practice, however, this condition is approximated and is fulfilled for only one wavelength in the spectral range used for most visual purposes, it being well known that such procedure very materially increases transmission assuming, of course, that the film is of uniform thickness and is evenly distributed over the glass surface. The thickness of the film may be readily and accurately determined by observation since different interference colors appear in the light reflected by the article with changes in film thickness. For example, light reflected by an air-glass surface treated for best light transmission for the mean wavelength of the visual range noted, will have a magenta color when viewed in white light.

Treatment of the article with the leaching agent to create a layer of the desired thickness is controlled, as known to the art, by proper time-temperature-concentration relations dependent upon the particular kind and type of glass undergoing filming and for the particular leaching agent employed. Solvents for the oxides other than silica include acid solutions, salt solutions, alkaline phosphate solutions and molten salts. Usually a dilute acid solution is employed for leaching, the article being immersed in whatever leaching agent is employed until it has filmed to the desired thickness.

The common glasses are made up of a random network of strongly bonded silicon and oxygen atoms with other elements joined to the basic network through oxygen linkages. Formation of surface layers on the glass is possible because the less strongly bonded elements can enter into chemical reactions without damage to the silica network. When a silicate glass is treated with a water solution of an acid, the acid soluble atoms leave the glass to go into solution, while hydrogen ions, in some cases at least, replace the metal ions forming a partially hydrated silica layer. Different acids may remove different amounts of the acid soluble oxides. If a glass is treated with a salt solution, the reaction may be similar to that produced by a dilute acid, or, under special conditions, metal ions from the salt may enter the glass. Where a molten salt is brought in contact with a glass surface, a reaction similar to that between a salt solution and glass may be expected in that the salt ions may or may not replace metals in the glass depending on the compositions involved and the conditions of the treatment. In producing silica films for increased light transmission, the acid treatment is ordinarily used, since the slight hydration produced has little effect on the refractive index or hardness of the silica film.

As heretofore pointed out, it is uncertain if a transmission film will be formed on a ground and polished or otherwise finished glass surface treated with one of the reagents in the manner noted just above and should such a film be formed, there is a strong possibility of it being imperfect due to it being too thin or of uneven thickness or because it is unevenly distributed over the surface. The present invention relies upon our discovery that the creation of a film possessing all of the desired characteristics is dependent upon the history of the surface being subjected to treatment and provides procedure for assuring that a desired uniform film will be formed.

The discovery just mentioned resides in the fact that the silica film or surface layer on the glass becomes increasingly impenetrable to the leaching agents heretofore named. Dehydration of the silica film, which apparently takes place, may be used as an aid to explain this phenomenon. It would seem that as dehydration proceeds, the film densifies and becomes increasingly impenetrable as noted and will in fact become substantially completely impenetrable if densification is permitted to proceed far enough. Until this latter stage is reached, however, there is always an opportunity for film growth although the rate of film formation decreases with increase in the degree of apparent dehydration. By this theory, upon dehydration there is sufficient densification of the strongly bonded silicon and oxygen atoms to present a new surface which is less penetrable to the leaching agents of the class described. Films on glasses containing a large percentage of soluble oxides will acquire this characteristic in a relatively short time even at room temperature. Under such a condition, film growth will be slowed inasmuch as a leaching agent will not reach or penetrate so easily to the interface between the surface film and the glass to attack the soluble oxides of the latter.

It appears that dehydration and densification occur together. We have reason to believe that heat may be expected to promote densification of a film even after any dehydration has stopped. Of importance is the fact that we have discovered that heat treatment will force this apparent dehydration and will so densify a film that it will become stabilized or resistant to leaching agents. This is of particular significance where accidental filming has occurred, since a fabricated glass article is at times subjected to processing temperatures, in grinding, polishing and edging operations for example, which are far in excess of room temperatures. Moreover, forced dehydration by intentional heat treatment may be availed of to positively stabilize a formed film at its desired thickness.

The importance of our discoveries will be well appreciated when it is considered that there are veritable unlimited opportunities for accidental or incipient filming of a glass surface from a time following the fabrication of an article and including its grinding and polishing or other finishing to the time the article is subjected to leaching. We have found that the presence of accidental films is difficult to detect since they are generally too thin to produce visible interference color. This fact coupled with our other discoveries and the likelihood of the occurrence of accidental filming, afford an explanation showing why chemical treatment processes now employed by the art produce many articles of an unsatisfactory nature.

In connection with accidental filming, several points should be kept in mind. One of these is the fact that glass of substantially all compositions is susceptible to at least some attack by even extremely weak leaching agents, such for example as weak solutions of the agents heretofore described, and that such attack results in film formation. It is for this reason that acid from finger prints, received during handling, will film an article and also why carbon dioxide in moist air, forming carbonic acid, will also create a surface layer. Another point to note is the fact that the thickness of an accidental film which has become partially or completely dehydrated is immaterial as to its preventive effect on subsequent film growth or increase in thickness. A further point to be kept in mind is the fact that certain glasses are more soluble to leaching agents than others and that where such is the case filming may begin almost instantly upon contact with the leaching agent.

The chances of accidental film formation and the stabilization of such accidental films may be best understood by a consideration of the processing operations in which accidental or incipient filming and dehydration can occur. For the purpose of explanation, the processing of an optical element, for example a lens, has been chosen by way of illustration, it being understood that the applications of the invention are not necessarily limited to treatment of such an article or to use with optical glass.

Accidental filming of a lens may be traced directly to moisture, or the water and aqueous cleaning solutions used in grinding and polishing, the latter sometimes containing other leaching agents besides carbonic acid. It is to be noted that the ordinary water employed in grinding and polishing contains enough dissolved carbon dioxide from the atmosphere to be weakly acid so that its prolonged contact with glass will produce filming. Moreover, experiments have shown that even distilled water will dissolve sufficient quantities of carbon dioxide to cause filming, indicating that it is not dissolved solid impurities in the water which give rise to this condition but its acidic character.

Briefly tracing through the grinding and polishing operations in the order in which they are employed by the prior art, it may be observed that accidental filming of a lens may occur from allowing the water slurry, which contains the grinding and polishing abrasives, to remain in contact with the first finished surface of the lens blank after completion of its grinding and polishing; from treatment of the partially finished blank with an aqueous washing solution to clean off pitch from the blocked side of the blank prior to grinding and polishing such side, alkali solutions containing alkalis which will film glass usually being employed, with tri-sodium phosphate generally being used for this purpose; from cooling water used in the drilling of a depth hole on the unfinished side of the lens blank prior to grinding and polishing of this side, the hole being used as a guide to determine the extent of the second surface to be ground away; from allowing the water slurry to remain in contact with the second finished surface of the lens upon completion of its grinding and polishing; from treatment of a lens with an aqueous washing solution of an alkali cleaner to remove pitch from the lens after grinding and polishing of the second side; from water used for cooling purposes and to wash away material cut from the lens edge during centering and edging of the ground and polished lens; and, from an aqueous cleaning solution following edging of the lens prior to storage or chemical treatment for transmission film formation. Not to be forgotten is the fact that during all of the above operations filming may occur from the acid of fingerprints received during handling of the lens.

It will thus be realized that in the usual processing operations at the stage prior to storage, each surface of the lens may be completely covered with an accidental film or each surface may have unfilmed and accidentally filmed areas giving the appearance of a patchwork quilt pattern. A patchwork pattern can be expected where some of the treatments result in aqueous contact with only certain portions of the surface areas of each side of the lens. Also it will be realized that there could be a combination of the accidental filming just described. Besides the possibility of uneven distribution of the accidental filming there is a further possibility of all of the accidental films being of different thickness due to the differences in time which the lens was in contact with an agent capable of causing filming. These accidental films are often of such infinitesimal thickness that they are difficult to detect and frequently are too thin to show interference colors.

While it is important to note at this stage that at least some accidental filming has taken place where the usual grinding and polishing procedure is followed, it should be observed that at least some of these accidentally formed films have to at least some extent become resistant to leaching agents due to their heating in grinding and polishing operations. For example, sufficient heat to render any film formed upon the already ground and polished side impenetrable to at least some degree is applied to a partially finished lens while reblocking it in pitch for grinding and polishing of the second or unfinished side, it being noted that formation of films on any unfinished surface and their stabilization is not detrimental as such films will be ground away when the unfinished surface is ground and polished. Stabilization of accidentally formed surface layers can also be expected in centering and edging operations where a completely ground and polished lens is fixed on the lens holder of an edging machine by wax to which and from which the lens is secured and removed only after it is heated.

In the presence of such conditions it will be immediately appreciated why it is impossible in many instances to create a uniform transmission film of desired even thickness and distribution on a ground and polished lens surface and why in some instances it is impossible to provide any intentionally created surface layer whatsoever.

Frequently under manufacturing practice a ground and polished lens is stored prior to attempting to create a transmission film upon its surfaces. The effects of storage upon the lens should be considered, since both accidental filming and dehydration of accidental films formed prior to storage may be augmented by existing storage conditions. For example, while the permeability of a film decreases with age, even at room temperature, reactivity on accidentally filmed areas as well as initial activity on unfilmed areas can set in where the atmosphere of the storage room contains considerable moisture. The degree of any filming or dehydration in storage is, of course, influenced by the length of storage and the composition of the glass of the lens. Moreover, during storage, as in grinding and polishing, it should be noted that filming can occur from the acid of a fingerprint placed upon the lens in handling. The changes which can occur during storage explain why it is frequently impossible to form a transmission film of even thickness and distribution upon the surface of a lens.

Our invention avoids those difficulties leading to imperfect filming by presenting an unfilmed polished surface for chemical treatment and by stabilizing the perfectly formed transmission film against continued growth. In one form of practice for the invention, a lens blank, which has been molded to the approximate size, shape and curvature of the finished lens, is coated on one side with a suitable synthetic or natural resin, such as a phenol formaldehyde resin or shellac. With the uncoated side uppermost, the blank is then blocked in pitch in the usual manner upon a lens block. The exposed surface of the blocked lens is next rough and fine ground and then polished in the ordinary manner, a water slurry containing the abrasive material being employed in this operation. While the slurry is weakly acidic because of dissolved carbon dioxide from the atmosphere and can be expected to film the exposed glass surface, there is no likelihood of such occurring inasmuch as the rate of surface removal by grinding and polishing is in excess to the rate of film formation.

However, as heretofore pointed out, filming can be expected if the slurry is allowed to remain on the polished surface for any length of time. To prevent filming when grinding and polishing is arrested, the polished surface is immediately wiped free of slurry and is dried. With the lens still on the block, a waterproof coating is applied to the polished and just wiped surface in order to protect it in further handling from moisture or aqueous contact or fingerprinting. Suitable waterproof coating materials include lacquers, resinous coatings and waxes or a mixture of a resinous coating and a wax. For this purpose a styrene resin has been found very satisfactory.

The lens is now ready for grinding and polishing of the second or unfinished side and for this purpose must be removed from the block. To accomplish this removal, the block with the lens still blocked thereon is thoroughly chilled from 30 to 45 minutes in a refrigerator or other cooling cabinet. At the end of this time the lens may be readily freed from the pitch and removed from the block without pitch adhering to its surfaces, some tapping of the block being necessary at times to break the bond between the pitch and the glass. Removal in this manner is made possible by reason of the difference in contraction between the glass and its resinous blocking coat on the unfinished surface of the lens and the pitch to which the lens is bonded.

While the lens is being ground and polished it must be held in a fixed position with respect to the block. Thus the bonding characteristics of the blocking coat with the glass and with the pitch are important and it will be appreciated that the physical properties of such material enter into its selection. Similar consideration must also be given in choosing the waterproof coating applied to the side of the lens first ground and polished since it is this side which contacts the pitch when the lens is reblocked to grind and polish the unfinished side.

Following removal from the block, the lens is turned over and is reblocked with the second and unground side uppermost, blocking being carried on in the usual manner. While this reblocking is accomplished by heating of the pitch to approximately 275° F. it should be noted that this heat will have no effect upon the polished side of the lens which is in an unfilmed condition due to the special treatment given to it. The second surface is then ground and polished in the manner hereinbefore described, care being taken at the completion of the polishing to wipe away all traces of slurry. Treatment like that heretofore disclosed is continued in that a waterproof coating is applied to the second surface and following chilling of the lap the ground and polished lens is removed.

At this stage the lens is usually prepared for the leaching step which leads to the creation of the desired transmission film by first removing the waterproof coatings from the lens. However, several variations in this procedure may be practiced. For example, the lens may be centered and edged and then stored indefinitely until required for filming or it may be first stored and then centered and edged or there may be a combination of these practices. In any event where the waterproof coating remains on the lens it will prevent filming from fingerprinting, moisture and aqueous solutions which may contact the lens while either in storage or during the centering and edging operations. Since the lens is unfilmed and is protected from film formation, its heating when centered and edged will, of course, cause no detrimental effect.

Regardless of whether or not the lens has been centered and edged, its waterproof coatings are removed prior to chemical treatment to create transmission films. Satisfactory removal of the waterproof coatings may be effected in the usual manner with a non-aqueous organic solvent, alcohol or benzol being suitable for this purpose. It should be noted that by the control steps of treatment previously described, a desideratum of this invention is here fulfilled, namely, the presentation for leaching of a ground and polished lens having surfaces completely receptive to desired uniform filming.

In leaching, reagents which may be employed include nitric, hydrochloric, sulphuric, acetic, boric or phosphoric acid solutions or solutions of acid sodium phosphate or of copper, nickel or ferric sulphate and molten salts, such as sodium or potassium nitrate or sodium or potassium hydrogen sulphate, may also be employed. Film formation is accomplished by immersing the glass to be treated in a bath of one of the above reagents until a film of the desired thickness has been formed. The control for this treatment, as is known to the art, is based upon time-temperature-concentration relations depending upon the particular composition of the glass being treated and upon the particular leaching agent used.

Fortunately film formation of the desired thickness may be readily determined by visual observation. Light reflected by a glass surface provided with a transmission film of a thickness equal to one-quarter ($\frac{1}{4}$) the mean wavelength of light for the usual spectral range to be transmitted will have a magenta color or hue when viewed in white light. Under similar conditions a film of either lesser or greater thickness will have a different hue. Thus a simple visual control means is provided. In practice, for a reason which will hereinafter become more apparent, a film of an optical thickness greater than one-quarter ($\frac{1}{4}$) wavelength is formed, the leaching operation being allowed to proceed until formation of a film having a thickness such that light reflected therefrom when viewed in white light appears of a true blue hue, and in which yellow and red are deficient.

With reference to the control relationships, it should be noted that the time of treatment for obtaining a transmission film of the desired thickness of one-quarter ($\frac{1}{4}$) wavelength may vary from 1 minute to 100 hours or more depending upon the composition of the treating bath, the glass composition and the temperature of the leaching agent. While we have indicated a large number of leaching agents, we generally prefer the use of nitric acid of a concentration of 1% by volume. With this we have had very great success in treating most of the glasses hereinafter named. Nitric acid is preferred because it may be safely handled, does not produce objectionable fumes, does not change greatly in its reactivity with changes in concentration and because its salts are soluble.

An exception to the preferred use of nitric acid occurs in connection with the soda-lime-silica crown glasses which are more satisfactorily treated with hydrochloric acid of the relatively high concentration of 17.5% by weight (50% solution of commercial hydrochloric acid in water). We have found that hydrochloric acid will film crowns of the class just mentioned at a considerable faster rate than nitric acid.

As one particular example of the invention which illustrates variation in the time-temperature relationship, it is pointed out that lenses of light barium crown glass have been successfully treated by immersing them in and subjecting them to the action of 1% nitric acid for 10 minutes at 70° C. Similar results were obtained when similar lenses were treated with a like solution for 1 hour at 50° C. and for 9 hours at 25° C. While these results show considerable variation in treatment periods, it should be kept in mind that time of treatment is subject to the visual control previously mentioned.

We have been able to successfully treat substantially all glasses of different compositions in substantially all the different commercial types of optical glass and by our method are able to guarantee substantially invariable uniform filming for such glasses as borosilicate crowns, soda-lime crowns, light barium crowns, dense barium crowns, light barium flints, extra light flints, barium flints, light flints, dense flints, dense barium flint and extra dense flints. This list marks a very considerable advance over prior art chemical methods which have been able to provide uniform films on only some of the glasses found in such types of glass as those noted. Moreover, it is to be observed that prior art practice is carried out only with extremely problematical and uncertain results in that the production of uniform films by chemical reaction on some glasses will run as low as 10% of the total number of articles treated and as such is to be distinguished from our methods of treatment which guarantee a substantially standardized result for each piece of glass which is processed.

The increase in the number of glasses which we have been able to treat satisfactorily as well as the uncertainty of filming when glass is leached under prior art methods may be explained by the fact that while most glasses will be attacked by the reagents noted, some glasses are considerably more reactive initially than are others, as is evidenced by their rate of surface filming. Prior art practices for grinding and polishing glass, as previously mentioned, afford myriad opportunities for accidental filming, which opportunities are coupled with many others for dehydration of these accidentally formed films to provide a protective coat which is resistant to chemical treatment for desired transmission film formation. It will hence be well appreciated that if accidental filming is prevented during processing, as it is under our controlled methods, many other glasses besides those already known by the art to be susceptible to successful chemical film formation, may also be successfully treated, while such treatment may be effected with the assurance of obtaining a uniformly filmed surface of a desired thickness.

It has been previously pointed out that as dehydration of a silica film proceeds, it becomes increasingly more impenetrable to leaching agents. Unfortunately the fact remains that prior to complete stabilization of a film on a glass surface by baking or heat treatment for example, there is an ever present opportunity for its growth, with a consequent increase in thickness, if a leaching agent, such for example as moist air or the acid of a fingerprint, contacts the glass. This is true even where rapid dehydration occurs at room temperature. It may be shown by the science of physics that growth of a film beyond the desired one-quarter ($\frac{1}{4}$) wavelength in optical thickness is extremely detrimental to the ability of the film to increase light transmission by preventing loss of light by reflection. In fact, film growth subsequent to chemical treatment for film formation has been one of the serious commercial disadvantages to the use of transmission films of this type.

We have found that by baking freshly filmed surfaces immediately after formation of transmission films, we can utilize our discovery regarding film stabilization to effectively prevent film growth or increase in the film thickness. The freshly filmed lens is heated or baked, in a suitable oven or the like, at a temperature of around 400° F. for a period of approximately 15 minutes.

Shrinkage of a film from dehydration under ordinary conditions is negligible for most glasses. We have discovered, however, that forced dehydration practice by heat treatment is accompanied by such a degree of densification of the silicon and oxygen atoms of the surface layer as to create an appreciable, although slight, shrinkage in the film and must be taken into account in the formation of a transmission film. It will now be understood why a transmission film is formed with an initial thickness slightly greater than the desired one-quarter (¼) wavelength.

In practice, temperatures ranging from 200° F. to slightly below the softening point of the glass being treated, may be employed, treating times decreasing with increase of temperature. There will, however, be no harm done to the lens or the film should it be baked within the temperature range given for a time period longer than that normally required to insure stabilization. The specific example given is of broad application and in general may be employed with all types of glass. After baking, a filmed glass article or lens may be subjected to weathering, handling or even further processing without fear of film growth. Moreover, shrinkage will not occur as the heat treatment has rendered the film constant as to thickness.

It is important to note that by the heretofore described process a film stabilized at a desired thickness is provided upon a ground and polished glass surface without damage to the latter. In this respect our invention is not to be confused with processes employing an acid or other chemical etch to skeletonize glass articles of a nature which do not require the polish of a lens such, for example, as beakers, flasks, bottles, tubes, sheets and the like. While application of our invention is not limited to the treatment of ground and polished articles, our process has nevertheless been designed primarily for treatment of articles of a character wherein any damage to their surfaces will greatly impair their efficient use.

We have indicated that several forms of practice for the formation of transmission films other than the processing described may be employed. In one of these, a lens is blocked in any suitable manner and its exposed surface is ground and polished as heretofore outlined, care being taken to wipe all traces of the water slurry from the lens upon completion of polishing. The lens is then removed from the block with the aid of a suitable tool and is then treated with non-aqueous organic cleaner, such as alcohol or benzol, to remove any pitch which may have adhered to it, after which it is filmed in an acid bath and is then baked. This treatment provides a stabilized surface layer on the ground and polished side of the lens. To obtain a transmission film upon the second or unfinished side of the lens, it is reblocked and the steps just noted are repeated. If desired the waterproof coatings heretofore described as applied to the lens surfaces, may be employed with this practice of film formation so as to permit the lens to be unblocked by chilling it.

The fact that the unground surface of the lens is provided with a baked film in the just described operations is immaterial since the subsequent grinding and polishing of this side will completely remove such a film. Moreover, heat or leaching agents encountered subsequent to treatment of the first filmed side will leave that side of the lens unaffected since the desired transmission film formed thereon has been stabilized and when in such condition is resistant to chemical attack and is not damaged by heat.

Another form of procedure for practicing our invention comprises subjecting a ground and polished lens, which has been processed in accordance with prior art teachings and which may or may not have been stored, to chemical attack by a solvent to remove any accidentally formed silica film upon the lens. Following treatment of this nature, uniform transmission films are formed and are then baked in the manner already described.

Suitable agents for removing a silica layer are solvents for silica. Their action is intended to remove the silica film and leave a glass surface of substantially identical composition with that possessed by the glass prior to its accidental filming. For removing silica films, we have had considerable success with a mixture of hydrofluoric and sulphuric acids and with a mixture of the alkali salts of hydrofluoric acid, such as ammonia, potassium and sodium salts, and sulphuric acid. The glass to be treated is immersed in such a mixture for from 3 to 20 seconds depending upon the composition of the glass undergoing treatment and the concentration of the mixture. Suitable concentrations for a mixture of this type will range from 0.1% to 1% by volume. This treatment may be readily controlled by visual observation so that removal of the polish on a surface by reason of prolonged contact with the mixture may be easily avoided.

By way of illustrating our invention we have diagrammatically shown, in the single view of the drawing, a partial sectional elevation of an article processed in accordance with any of the practices which we have described. In the drawing, the body of a glass article is indicated by the reference numeral 10 and is shown as having a stabilized transmission or surface film 11 formed to a uniform thickness and evenly distributed on the upper and lower faces thereof. While two films 11 have been shown on the body of the article to illustrate the more generally met requirement of providing a transmission film on each of a number of different faces, it will nevertheless be appreciated that this does not preclude procedure designed to permit the formation, as hereinbefore pointed out, of a film on only one face of an article.

Although the invention has been explained in connection with optical lenses, it is to be understood that its application is not limited to such articles. Obviously any article fabricated of glass susceptible of film formation by the treatment outlined or slight variations therein made necessary by the particular article comes within the scope of the invention. For example, other articles which could be treated include prisms, optical wedges, spectacle lenses, thermometer tubes, instrument dials, windows, beakers, flasks and the like. In instances where the ground and polished article treated has more than two sides, surface areas or faces, as distinguished from a lens, the proper steps in each of the processing practices heretofore described may be suitably repeated to permit filming on each side or area of the article. Obviously the processes heretofore set forth may be suitably varied to permit film formation of fabricated articles which are not ground and polished.

While we have described a film of an optical thickness of one-quarter (¼) the wavelength of light, it should be noted that this thickness has been chosen as that which will best satisfy the requirements for the elimination of reflection from a glass surface. It will be apparent that the invention comprehends the use of films for purposes other than increasing light transmission such, for example, as to increase surface durability and to this end contemplates the formation of films differing in thickness from that noted. Films of substantially any thickness up to several wavelengths of light may be formed and stabilized by our process. While films of greater than this maximum thickness may be formed, they are liable to crack and break away from the underlying glass when subjected to baking at stabilization temperatures. Danger of this latter is most likely to occur with glasses containing only a small amount of silica.

By the practices which we have set forth, it will be evident that we have accomplished the aims and purposes of our invention. Not only have we provided a procedure for assuring uniform filming to desired thickness for many types of glass without detriment to the surface polish but at the same time have provided a method to stabilize these films against growth or thickness changes subsequent to their desired formation.

While we have described the preferred embodiment of our invention, we wish it to be understood that we do not confine ourselves to the precise procedure and the specific reagents herein set forth, by way of illustration, as it is apparent that many changes and variations may be made therein, by those skilled in the art, without departing from the spirit of the invention or exceeding the scope of the claims hereto appended.

We claim:

1. In the method of treating a glass article which has a structure formed of a network of strongly bonded silicon and oxygen atoms to which acid soluble glass forming elements other than silicon are joined by oxygen linkages and which has a number of areas which are successively ground while contacted by a water slurry containing abrasive material, the steps of protecting said areas from the formation of undesired surface films thereon during successive grinding operations on the article by removing substantially all of said slurry remaining on each ground area immediately following the grinding of such area and by immediately applying a waterproof coating to at least all of the ground areas except the last area to be ground following the removal of the slurry from each ground area, dissolving the waterproof coatings with an organic solvent, treating the completely ground and uncoated article for the formation of a surface film on each ground area by subjecting the article to the action of a leaching agent which will remove any acid soluble oxide other than a silicon oxide of the glass from said areas to leave a surface film thereon which is rich in silica, and rendering said films substantially impenetrable to said leaching agent by heating the article to a relatively high temperature but below the softening point of the glass for a time sufficient to densify said surface films, whereby the films are stabilized against change of thickness.

2. A method of treating a glass article of the character which has a silicon oxide and at least one acid soluble oxide of a glass forming element other than silicon in its composition and which has a number of areas which are successively ground while contacted by a water slurry containing abrasive material, said method comprising the steps of protecting said areas from the formation of undesired surface films thereon during successive grinding operations on the article by removing substantially all of said slurry remaining on each ground area immediately following the grinding of such area and by immediately applying a waterproof coating to at least all of the ground areas except the last area to be ground following the removal of the slurry from each ground area, dissolving the waterproof coatings with an organic solvent, treating the completely ground and uncoated article for the formation of a surface film on each ground area by subjecting the article to the action of a leaching agent which will remove acid soluble oxides other than silicon oxides from said areas to leave a surface film thereon which is rich in silica and of a thickness slightly greater than that desired upon the finished article, and rendering said surface films substantially impenetrable to said leaching agent by heating the article to a relatively high temperature but below the softening point of the glass for a time sufficient to densify said surface films, whereby the films are shrunk to the desired thickness and are substantially stabilized against change of thickness.

3. In the processing of a glass article which has a composition comprising a silicon oxide and at least one acid soluble oxide of a glass forming element other than silicon and which has a number of areas which are successively ground to provide a surface on each area of a desired contour, the treatment of each area immediately following the grinding operation thereon and before the grinding of any other area on the article which comprises removing moisture remaining on such ground area at the completion of the grinding operation therefor, then forming a surface film on the ground area by subjecting the article to the action of a leaching agent which will remove any acid soluble oxide other than a silicon oxide from said article to leave a surface film which is rich in silica on said area and which is of a thickness slightly greater than that desired on the finished article, and then rendering the surface film on said area substantially impenetrable to said leaching agent by heating the article to a relatively high temperature but below the softening point of the glass for a time sufficient to substantially completely dehydrate said surface film whereby the film is shrunk to the desired thickness and is substantially stabilized against change of thickness.

4. A glass body characterized by having a structure comprised of a basic network of strongly bonded silicon and oxygen atoms to which acid soluble metallic elements other than silicon are joined by oxygen linkages and a surface film which is substantially evenly distributed over at least one face of said body and which differs in structure from the body by being substantially free of any of said metallic elements other than silicon, said film being of a substantially uniform thickness not exceeding several wavelengths of some component of the visual spectrum and being densified to render it substantially stable and permanent in thickness.

5. As a new article of manufacture, a glass article having a body comprised of a silicon oxide and at least one acid soluble oxide of a metallic glass forming element other than silicon and a transmission film of substantially uniform thickness which is evenly distributed on a surface of said body, said transmission film being comprised substantially of silica and being heat treated whereby to substantially stabilize it against growth.

6. As a new article of manufacture, a transparent glass body formed of glass having a single homogeneous vitreous phase and a surface film on said body, said film consisting substantially of silica and having a thickness not exceeding several wavelengths of some component of the visible spectrum, said film being densified and stabilized against growth.

7. In a method of providing a surface film on a glass body which consists of a single, homogeneous vitreous phase formed of a network of strongly bonded silicon atoms to which weakly bonded elements other than silicon are joined by oxygen linkages, the steps of leaching out from the glass consisting of the single homogeneous vitreous phase primarily the weakly bonded elements by a leaching agent which will remove the weakly bonded elements in the form of soluble compounds and leave on said body a surface film which is rich in silica and rendering said surface film substantially impenetrable to leaching agents by heating the glass body to a temperature which is relatively high but below the softening point of the glass body until said surface film is densified and rendered stable against growth.

8. The method of forming a surface film of desired thickness on a glass body having a single, homogeneous vitreous phase formed of a network of strongly bonded silicon atoms to which weakly bonded elements other than silicon are joined by oxygen linkages which comprises leaching out from the body of glass having a single, homogeneous phase primarily the weakly bonded elements by a leaching agent which will remove the weakly bonded elements in the form of soluble compounds and leave on said body a surface film rich in silica and having a thickness slightly greater than that desired on the finished article and rendering said film impenetrable to said leaching agent by heating the glass body to a relatively high temperature but below the softening point of the body for a time sufficient to cause a shrinkage of said film to the desired thickness whereby the film is stabilized against growth.

9. A method of treating a glass article formed of transparent glass having a single, homogeneous vitreous phase formed of strongly bonded silicon atoms to which elements other than silicon are weakly joined by oxygen linkages which comprises grinding and polishing an area on said article, removing moisture from the area and immediately thereafter protecting said area by applying a waterproof coating, subsequently removing said coating and immediately thereafter subjecting said area to the action of a leaching agent to remove primarily the weakly bonded elements and leave a silica rich surface film and stabilizing said film against growth by heating the article to a relatively high tempereature but below the softening point of the article whereby the film is densified.

FRANK L. JONES.
THEODORE J. ZAK.